US006952463B2

(12) United States Patent
Ahmed et al.

(10) Patent No.: US 6,952,463 B2
(45) Date of Patent: Oct. 4, 2005

(54) METHOD OF BLIND TRANSPORT FORMAT DETECTION BASED ON POWER TRANSITION

(75) Inventors: Walid Ahmed, Eatontown, NJ (US); Si Ming Pan, Emmaus, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 839 days.

(21) Appl. No.: 09/966,504

(22) Filed: Sep. 28, 2001

(65) Prior Publication Data

US 2003/0063661 A1 Apr. 3, 2003

(51) Int. Cl.[7] .......................... H04B 17/00; H04B 3/46; H04Q 1/20
(52) U.S. Cl. ...................................... 375/377; 375/316
(58) Field of Search ................................ 375/224, 225, 375/340, 342, 377, 316

(56) References Cited

U.S. PATENT DOCUMENTS

| 5,434,866 | A | * | 7/1995 | Emerson et al. | ............ 370/476 |
| 5,923,705 | A | | 7/1999 | Willkie et al. | ............ 375/220 |
| 5,928,377 | A | | 7/1999 | Doran et al. | ................ 714/786 |
| 6,732,302 | B1 | * | 5/2004 | Palenius et al. | .............. 714/48 |
| 2002/0108090 | A1 | * | 8/2002 | Ariel et al. | .................. 714/792 |
| 2003/0007580 | A1 | * | 1/2003 | Nagata et al. | ............... 375/341 |

FOREIGN PATENT DOCUMENTS

| EP | 1422900 A1 | * | 5/2004 | ........... H04L/29/02 |
| WO | WO 01/19043 A1 | | 3/2001 | ........... H04L/25/02 |
| WO | WO 01/24465 A1 | | 4/2001 | ........... H01L/25/02 |

OTHER PUBLICATIONS

H. M. Kwon et al., "One Viterbi Decoder With Data Rate Estimation For IS–95 CDMA Wireless Communications", Global Telecommunications Conference, 1997. Globecom '97., IEEE Phoenix, AZ, Nov. 3–8, 1997, pps. 594–598.
European Search Report.

* cited by examiner

Primary Examiner—Tesfaldet Bocure
Assistant Examiner—Juan Torres
(74) Attorney, Agent, or Firm—Ozer Teitelbaum; James Milton

(57) ABSTRACT

A method of detecting the format of received information by measuring the time period during which information being received have a power that is at or above a defined threshold. The measured time period and the information rate of the received information are then used to determine an estimate information size value of the received information. The estimated information size value is then applied to an algorithm that determines the format of the received information. Therefore, the format of received information can be detected without the use of TFCI information.

12 Claims, 2 Drawing Sheets

METHOD OF BLIND TRANSPORT FORMAT DETECTION BASED ON POWER TRANSITION

RELATED APPLICATIONS

Related subject matter is disclosed in the following applications concurrently filed herewith: U.S. Patent Applications entitled "Method of Blind Transport Format Detection" Ser. No. 09/966828.

BACKGROUND OF THE INVENTION

1. Field of the Invention

The present invention relates to Blind Transport Format Detection (BTFD) for wireless communication systems.

2. Description of the Related Art

Communication systems and in particular, wireless communication system convey (i.e., transmit and/or receive) information over communication channels in accordance with protocols of one or more established communication standards. Protocols are rules and procedures that dictate how information within a communication system are to be transmitted, propagated and received. Established communication standards comprise protocols that have been reviewed and approved by committees typically formed from communication equipment manufacturers and pertinent government regulators.

In wireless communication systems, and in particular, in wireless communication system that comply with the 3 GPP (Third Generation Partnership Project) standard for UMTS (Universal Mobile Telecommunication System) systems, information that is to be transmitted are formatted in multiple modes. The information is transmitted by transmission equipment which can be either system equipment or user equipment. The system equipment are the various equipment owned, operated and maintained by a system provider. Equipment at a base station are examples of system equipment. User equipment is any equipment typically used by a user or subscriber of a wireless communication system. Examples of user equipment include cellular phones, wireless laptops and pagers.

The formatting of information refers to the arrangement of units of information (typically bits) into groups or blocks of information where the size of each block is defined. Suppose, for example, that the 3GPP standard uses eight modes to do its formatting. Each of the eight modes of the 3GPP standard arranges information to be transmitted into three blocks respectively referred to as Class A, Class B and Class C blocks. In UMTS, the Class A, Class B and Class C blocks are referred to as Transport Channels (TrCh) and each Transport Channel has a format called a Transport Format (TF). The modes typically are the operating modes of Codecs which are devices and/or functions within the system equipment and/or subscriber equipment that perform the coding operations. The following is a table showing the format for each of the eight modes for UMTS systems that comply with the 3GPP standard:

TABLE 1

| Mode | Class A | Class B | Class C |
|---|---|---|---|
| mode 1 | 81 bits | 103 bits | 60 bits |
| mode 2 | 65 bits | 99 bits | 40 bits |
| mode 3 | 75 bits | 84 bits | 0 bits |
| mode 4 | 61 bits | 87 bits | 0 bits |

TABLE 1-continued

| Mode | Class A | Class B | Class C |
|---|---|---|---|
| mode 5 | 58 bits | 76 bits | 0 bits |
| mode 6 | 55 bits | 63 bits | 0 bits |
| mode 7 | 49 bits | 54 bits | 0 bits |
| mode 8 | 39 bits | 56 bits | 0 bits |

After the information to be transmitted is arranged, i.e., formatted, as per one of the above modes, each of the groups of information is coded for error correction and/or error detection. Coding is a technique whereby redundancies are introduced in information to be transmitted to protect the information from having errors due to the information having been propagated through a communication channel. Error correction coding is used to correct errors and error detection coding is used to detect errors. The formatted information is subjected to various levels of coding and information padding. In particular, for UMTS systems, the formatted information is applied to a Cyclic Redundancy Coder (CRC) and tail bits are then added to pad the coded information. The formatted, coded and padded information is then applied to a convolutional coder. The output of the convolutional coder is the information coded through special mapping of every unit of the information. For example, for a convolution coder which maps 2 bits for every 1 bit of information (i.e., Rate ½ coding), the total number of bits for each transport channel is doubled. Convolutional coded information for each of the three transport channels is thus generated. Convolutional coding is one type of error correction coding. CRC coding is one type of error detection coding. The information of the three channels are then multiplexed prior to transmission.

FIG. 1 depicts an example of a format of the transport channels of a UMTS that complies with the 3GPP standard. Information block 100 represents the format for a transport channel which contains A bits of information with an appendage of 8 CRC bits and 8 tail bits; this transport channel is commonly referred to as TrCh1. Information block 102 represents the format for a transport channel which contains B bits of information with 8 tail bits appended; this transport channel is commonly referred to as TrCh2. Information block 104 represents the format for a transport channel which contains C bits of information and 8 tail bits; this transport channel is commonly referred to as TrCh3.

The multiplexed information is then transmitted over a communication channel or channels of the UMTS system. In UMTS systems the information is transmitted in synchronization with a timing period called a TTI (Transmission Time Interval). Transmitting equipment and receiving equipment of the system are synchronized to the TTI. Each TTI period has a beginning and an end; three blocks as per Table 1 are transmitted during a TTI. At a receiving equipment, a Class A block is first received followed by a Class B block and then a Class C block. The size of each of these received blocks is dictated by the mode in which the system is currently operating.

At a receiving equipment, the information is decoded by applying procedures that are the reverse of the procedures applied by the transmitting equipment. As with the transmitting equipment, the receiving equipment can be system or subscriber equipment. In order to properly decode the formatted information, however, the receiving equipment uses the actual coded block of information and information about the formatting (i.e., size of the blocks of information over each of the transport channels) of the received block. In particular, a received coded and formatted block of information is decoded by using the actual block and the size of that block to decode (e.g., CRC decoding, convolutional decoding) the received information. For example, referring to Table 1, a Class A block of information is properly decoded when that block of information is applied to a decoder of the receiving equipment and the decoding uses the correct size value (i.e., the value of 81) to perform the decoding operation. If the size value used by the decoder is incorrect, the received block will not be decoded correctly.

To address the issue of knowing the correct block size, the current UMTS standard uses a signaling channel within which TFCI (Transport Format Combination Indicator) information is transmitted to the receiving equipment. The TFCI contains the value that represents the size of the received block. In the example discussed above, the TFCI would contain the value of 81 for a Class A block, 103 for a Class B block and 60 for a Class C block. Because the decoding of the received information is dependent upon a correct size value for a received block of information, the TFCI is typically heavily coded and made more robust so as to better handle channel anomalies thus reducing the likelihood of incurring errors. As a result, more bandwidth and power is needed to transmit the TFCI. Furthermore, even though the heavy coding of the TFCI reduces the likelihood of errors occurring in the TFCI, an error bound still exists. The error bound is the best error rate that can be expected from TFCI for the type and amount of coding applied to the TFCI.

What is therefore needed is a way of detecting the format of received information without having to use TFCI.

SUMMARY OF THE INVENTION

The present invention provides a method of detecting the format of received information without the use of TFCI information. The present invention provides a method for Blind Transport Format Detection (BTFD) for a communication system for information conveyed over communication channels of the communication system. One of the communication channels through which information is received is defined as a guiding channel of the communication system. Information, transmitted at a certain information rate, is received over various channel, including the defined guiding channel of the communication system. A power threshold is established and the time period during which information being received has power equal to or above the threshold is measured for each of the communication channels - - - including the guiding channel. The product (i.e., multiplication) of the information rate of information received over the guiding channel and the measured time period for received information from the guiding channel is calculated. The result of the calculation provides an estimate for the information size value of the information received over the guiding channel. The estimate of the information size value for the guiding channel is applied to an algorithm that determines the format of the received information.

DETAILED DESCRIPTION

Figure 1:
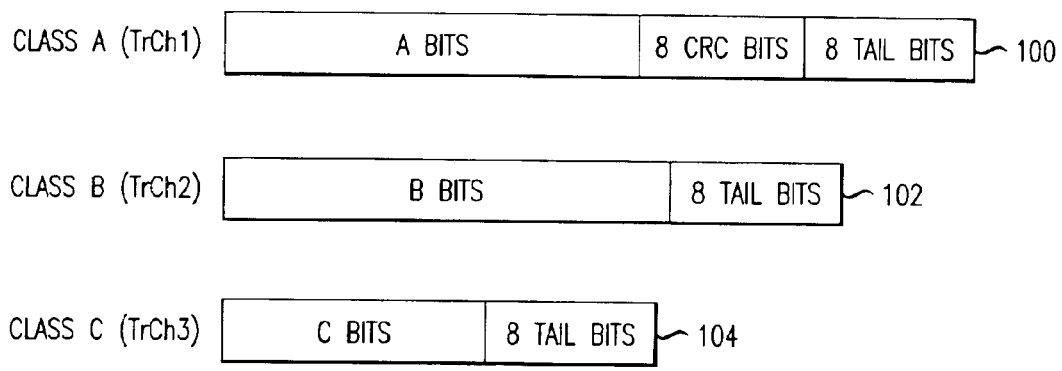
FIG. 1 depicts the format of the transport channels for a UMTS that complies with the 3GPP standard.

The present invention provides a method of detecting the format of received information without the use of TFCI information. The present invention provides a method for Blind Transport Format Detection (BTFD) for a communication system for information conveyed over communication channels of the communication system. One of the communication channels through which information is received is defined as a guiding channel of the communication system. Information, transmitted at a certain information rate, is received over various channel, including the defined guiding channel, of the communication system. A power threshold is established and the time period during which information being received has power equal to or above the threshold is measured for each of the communication channels - - - including the guiding channel. The product (i.e., multiplication) of the information rate of information received over the guiding channel and the measured time period for received information from the guiding channel is calculated. The information rate is the ratio of an amount of information to a unit of time. For digital information, the information rate is expressed in terms of bits per second (bps). In most communication systems the information rate or the range of the information rate is defined by the standard being followed by the communication system. Also, receiving equipment have the capability to measure the rate at which they receive information. The result of the calculation provides an estimate for the information size value of the information received over the guiding channel. The estimate of the information size value for the guiding channel is applied to an algorithm that determines the format of the received information.

For ease of explanation, the method of the present invention will be explained in the context of a UMTS communication system that complies with the 3 GPP standard with a format as per Table 1. The information is thus represented in digital form with the unit of information being a bit. It will be readily understood that the method of the present invention is applicable to other communication systems (wireline or wireless) that use some type of formatting scheme prior to transmitting information over their communication channels. Information to be transmitted are multiplexed into three different channels (called transport channels) each of which has a format defined as per Table 1. For purposes of discussion and ease of explanation, transport channel 1 (TrCh1), through which Class A bits are conveyed, is selected as the guiding channel. The guiding channel is one of the transport channels of the communication system whose information size value, once detected, will allow the information size value of the other channels to be determined from a lookup table or some other mapping technique. The format of all the transport channels can thus be detected. The channel through which Class B bits are conveyed is transport channel TrCh2 and the channel through which Class C bits are conveyed is transport channel TrCh3.

The guiding channel is preferably a channel that has a unique format for each of the modes of operation of the transmitting equipment and has more robust coding than the other channels. For example, TrCh1 is the only channel of the three channels that not only has tail bits, but also CRC coding bits. Further, each of the information size values for the eight modes of operation for TrCh1 is unique in that they are not repeated. For example, for TrCh1, no mode other than mode 1 has an information size value of 81 bits. Thus, using Table 1 as a lookup table, if an information size value of 81 is detected for the guiding channel (i.e., TrCh1), then the format of the other transport channels can be determined; that is, as per Table 1, information size of 81 for TrCh1 corresponds to information sizes of 103 and 60 for TrCh2 and TrCh3 respectively. The lookup table is constructed so that the corresponding formats (i.e., information size values) of the other transport channels can be determined once the guiding channel format is detected.

It should be understood that more than one guiding channel can be used and criteria other than the ones described above (i.e., more robust coding, unique information size values) can be used to select the guiding channels. It should also be noted that the information size value can be expressed in terms other than the number of bits. For example, the information size value can represent the number of characters contained in the transmitted information where each character is 8 bits in length or some other length. Also, the information can also be represented in forms other than digital form. The number of different information size values existing for the transport channel is generally represented by M where M is any integer greater than zero.

Figure 2:
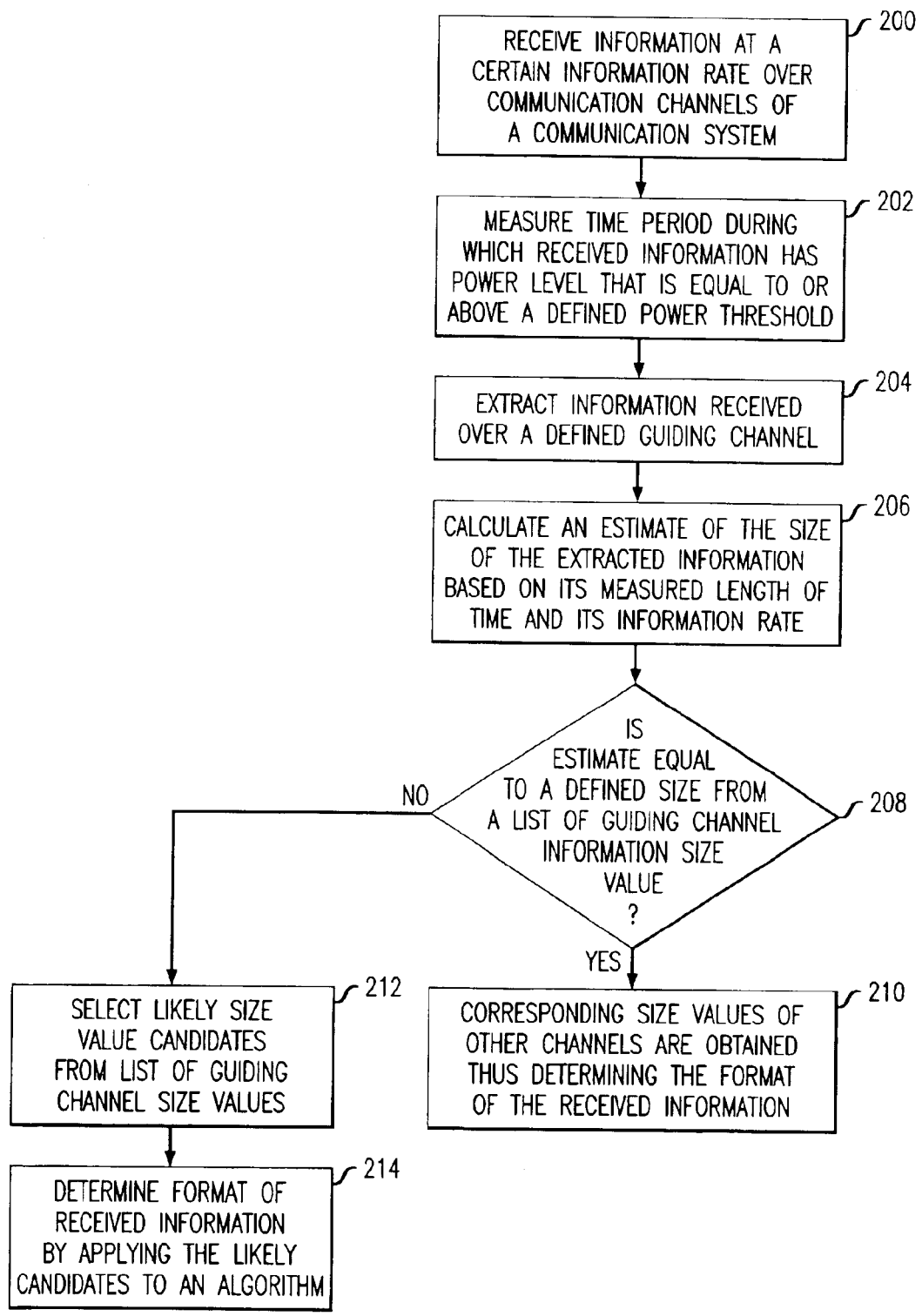
FIG. 2 is a flowchart depicting the method of the present invention.

Referring now to FIG. 2, in step 200, information is received by receiving equipment. In a UMTS communication system that complies with the 3 GPP standard, the received information has been coded (e.g., CRC coding and convolutional coding) and formatted as previously discussed. The received information comprises information from the three transport channels. The information is received with radio, processing and other well known equipment typically used to detect and receive communication signals.

In step 202, the length of time elapsed from the time that received information for guiding channel information (i.e., Class A bits) was above or equal to a defined power threshold is measured. The power threshold is defined by the service provider or by the 3 GPP standard. As the receiving equipment is measuring the communication signals carrying the guiding channel information, the power levels of the signals is compared to the defined threshold to determine the length of transmission. The measured power can be, for example, the average received power per symbol where each received symbol comprises a plurality of symbols each of which represent several bits of information.

The average received power is measured over a time window within which the average received power is equal to or above the defined power threshold. The defined power threshold need not be fixed. The threshold can depend, for example, on the quality of the communication channel (i.e., guiding channel) through which the communication signals are being transmitted. Thus, the defined power threshold can vary depending on the quality of the communication channel through which the communication signals are being transmitted. Certain channel conditions that affect the quality of a communication channel such as Bit Error Rate (BER), channel fading, channel gain can therefore affect the particular value of the power threshold. For example, when the conditions of a communication are of relatively low quality requiring that signals be transmitted at a higher power level, the threshold will accordingly be raised. Therefore, step 202 of the method of the present invention also comprises the step of determining the quality of the communication channel-by measuring BER and/or channel gain etc. - - - and adjusting the defined threshold accordingly.

The measurement of the time period in step 202 involves detecting a transition in the power (e.g., average power) of a received signal having multiple symbols that carry information. The information being carried can be, for example, one or more bits. Thus a transition from a power level below the defined threshold to a level at or above the defined threshold is detected. When signals, which have power levels below the defined threshold are received, such signals are not recognized and no information is extracted from such signals. Thus a transition from a power level below the threshold to a level at or above the threshold is detected. The length of time that the power level remains at or above the threshold level is measured. The end of the time period is detected when the power level transitions to a power level below the defined threshold.

Another method for measuring the time window is to define a specific time window of a certain time width and measure the average power of the received signal during this defined window. Then the window is slid in time by a small amount of time. The amount of time the window is slid is much smaller than the time width. The average power is again measured. The ratio of the measured average power of the first widow to the measured average power of the slid window is calculated. If a power transition occurred then the ratio is much larger than one. If no power transition occurred then the ratio has a value relatively equal to one. For example, suppose the first window starts at time 0 and ends at time 10 msec. The time width is therefore 10 msec. Suppose that the average power measured is $W_0$. watts. The 10 msec window is now slid by 0.1 msec meaning that the window now starts at 0.1 msec and ends at 10.1 msec. The average power of the second window is measured as $W_1$, watts. The ratio $W_0 W_1$ is calculated and if the ratio is relatively close to 1 then $W_0$ is nearly equal to $W_1$. If the ratio is relatively large (say 3) then a transition occurred at some time between 10 msec and 10.1 msec. A mapping function that takes into account various channel condition factors such as channel fading, channel gain, etc. . . is developed which can predict the time at which the transition occurred. Suppose for the example above a transition occurred at 10.15 msec, then the time during which the received signal was at or above the defined threshold is 10.15 msec.

In step 204, information received over the guiding channel (i.e., TrCh1) is extracted. The information received over the other transport channels are also extracted. The information both from the guiding channel and the other channels are temporarily stored in any well known memory circuit for further processing. The beginning of the received information is determined from the TTI timing with which the received equipment and transmitting equipment are synchronized. The extraction of information from the channels comprise various steps necessary to receive - - - synchronously with the TTI - - - radio signals over the various channels, demodulate said signals, convert said signals to information bits and demultiplex the information bits into separate information blocks for each of the transport channels.

In step 206, an estimate of the size of the extracted information is calculated based on the measured length of time and the information rate of the information extracted from the guiding channel. In particular when the information rate of the extracted information is known or measured, that rate is multiplied to the measured length of time. The result of the multiplication yields an estimate size of the received block of information. The estimate size can be rounded off to the nearest integer. For example, suppose information which is convolutionally coded with a rate ½ and CRC coded with 8 bits and also has 8 tail bits is received over TrCh1. Suppose further that the information rate for TrCh1 is measured or is defined by the standard (i.e., 3GPP) to be 144 kbps and the measured length of time is 1.097 milliseconds. The information size is thus estimated to be 144 kbps×1.097 msec which is equal to 157.968 bits which is rounded to 158 bits. To compensate for the convolutional coding, 158 is divided by 2 yielding 79 bits. The 8 tail bits and 8 CRC bits are then subtracted yielding 63 class A bits.

In step 208, the calculated size of 63 bits is compared to the list of size values for TrCh1. A calculation of 63 class A bits does not match any of the modes for TrCh1. Therefore, the method of the present invention moves to step 212 where the likely candidates for information size value of the guiding channel are selected. Any number of likely candidates can be selected, but typically the candidates which are closest to the calculated size are selected. In the given example, the selected candidates would be mode 2 which has 65 bits and mode 4 which has 61 bits.

In step 214 the selected candidates are applied to an algorithm for determining the correct size value and therefore, the format of the received information. The algorithm can be the one discussed in the concurrently filed application titled "A Method of Blind Transport Format Detection" where each of the selected candidates are used to perform decoding operations on the extracted information. The decoding operations comprise an error correction decode (e.g., convolutional decode) that yields a result on which a tail bit test and an error detection decode operation (e.g., CRC decode) are performed. The selected candidate that, when used to perform the decoding operations, yields a correct decode is chosen as the correct information size value. The corresponding information size values of the other channels can then be determined thus allowing the format of the received information to be detected. In the example discussed above, if 65 was found to be the correct information size value for the guiding channel (TrCh1) then the information size value for TrCh2 and TrCh3 would be 99 bits and 40 bits respectively.

A lookup table or some other mapping technique is used to store the information size values for the communication channels including the guiding channel. Once the guiding channel size value is found, the information size value of the other channels are determined from the lookup table. It should be noted that mapping techniques other than the lookup table can be used. For example, the detected information size values for the guiding channel can be used to point to the information size values of the other channels of the communication system yielding the format of the received information. Such other techniques as using the memory address or storage address of the detected information size value for the guiding channel to point to the corresponding memory addresses of the information size values of the other transport channels can be used for example.

When the calculated information size value is equal to one of the information size values of the list of size values for TrCh1, the method of the present invention moves to step 210. In step 210, the format of the received information is detected by obtaining the corresponding size values for the other channels. For example, suppose the calculated size value was 61, then the corresponding size values for TrCh2 and TrCh1 would be 87 and 0 respectively. A calculated information size value of 61 for TrCh1 is an exact match to mode 4 of Table 1.

We claim:

1. A method of format detection for information having an information rate and received over a communication channel of a communication system, the method comprising the steps of:

measuring the time period during which the information was received at a power level that is equal to or above a defined threshold wherein the time period is measured by detecting transitions in the power level of the received information, and calculating the amount of information in said received information during the measured time period as a function of said information rate and said measured time period, the amount of information received during the measured time period being dependent on which of a plurality of information formats is the format of said received information, and said method further comprising determining the format of said received information from said calculated amount of information.

2. The method of claim 1 wherein said transitions are detected by a) measuring the average power of a received signal carrying said information over a first time window of a certain time width, b) measuring the average power of said received signal over a plurality of second time windows of said certain time width, each said second time window beginning at a respective time after the start of said first time window, c) comparing the power measured in step a with each of the powers measured in step b, and d) identifying the occurrence of said transitions as a function of the results of said comparing.

3. The method of claim 1 wherein said communication channel is a guiding channel, wherein said guiding channel contains blocks of data with a unique format, and wherein the format of other channels is associated with said unique format of said guiding channel.

4. A method of format detection for information having an information rate and received over a communication channel of a communication system, the method comprising the steps of:

determining the format of the received information from the information rate and a measurement of a time period during which the information was received at a power level that is equal to or above a defined threshold wherein the time period is measured by detecting transitions in the power level of symbols carrying the information, wherein the communication channel is a guiding channel and the received information is extracted from the guiding channel, and determining the format of information in other channels based on the format of said guiding channel, wherein M information blocks of defined size for said guiding channel are associated with M information blocks of defined size for each of said other channels where M is an integer.

5. The method of claim 4 where said communication channel carries 3 GPP compliant UTMS communication signals.

6. The method of claim 4 wherein the step of determining said format of said received information comprises the steps of:

calculating an estimated information size value for information extracted from said guiding channel by multiplying said information rate by said measured time period;

selecting at least one information size value candidate from M information size values for said guiding channel based on the calculated estimated information size value; and applying the selected candidates to an algorithm for determining an actual information size value of said information extracted from said guiding channel when said estimated information size value is not equal to any of said M information size values for said guiding channel.

7. The method of claim 6 wherein the step of calculating an estimated information size value further comprises rounding off said calculated information size value to a nearest integer value.

8. The method of claim 6 wherein the format of the extracted information is determined from said calculated estimated information size value when that value is equal to one of said M information size values for said guiding channel.

9. The method of claim 6 wherein the step of applying the selected candidates to said algorithm for determining an actual information size value comprises performing an error correcting decode operation on said extracted information that yields a result on which a tail bit test and an error detecting decode operation are performed.

10. The method of claim 3 wherein the transitions in said power level occurs at the beginning and end of received blocks of data.

11. A method for use in a system in which information is communicated between communicating entities via a plurality of signals each transmitted over respective one of a plurality of channels using a selected one of a plurality of formats, there being for each format a respective information block size for each of said channels, the power of the signal transmitted over at least a particular one of said channels, serving as a guiding channel, being equal to or above a defined threshold when a block is being transmitted over that channel, the method comprising:

identifying said selected format in response to a determination of the block size being used in said guiding channel, and determining the block size being used in the others of said channels based on the identified format, wherein the determination of the block size being used in said guiding channel is made by measuring the time period during which at least a complete one of said blocks of information was received over said guiding channel by detecting transitions in the power level of the signal on that channel, and determining said block size as a function of said information rate and said measured time period.

12. The invention of claim 11 wherein said determining said block size as a function of said information rate and said measured time period comprises:

calculating an estimated block size by multiplying said information rate by said measured time period;

selecting at least one block size candidate from among the block sizes specified by said formats for said guiding channel, said selecting being based on said estimated block size; and identifying as the actual block size being used in said guiding channel by attempting to decode information communicated in said guiding channel utilizing the block size candidates and determining which of said block size candidates gives rise to a correct decode.

* * * * *